United States Patent

Bernard et al.

[11] Patent Number: 5,987,928
[45] Date of Patent: Nov. 23, 1999

[54] DEVICE FOR FIBERIZING MOLTEN MINERAL MATERIALS

[75] Inventors: Jean-Luc Bernard; Guy Berthier, both of Clermont; Jean Antoine Battigelli; Alain Giboult, both of Rantigny; Dominique Plantard, Paris, all of France

[73] Assignee: Isover Saint-Gobain, Courbevoie, France

[21] Appl. No.: 08/835,984

[22] Filed: Apr. 10, 1997

[30] Foreign Application Priority Data

Apr. 12, 1996 [DE] Germany .................. 196 14 570

[51] Int. Cl.$^6$ .................. C03B 37/022; C03B 37/04; C03B 37/02
[52] U.S. Cl. .................. 65/504; 65/521; 65/538
[58] Field of Search .................. 65/504, 521, 538

[56] References Cited

U.S. PATENT DOCUMENTS

| | | |
|---|---|---|
| 2,998,620 | 9/1961 | Stalego . |
| 5,085,679 | 2/1992 | Hinze et al. . |
| 5,474,590 | 12/1995 | Lin ............................................. 65/521 |
| 5,482,527 | 1/1996 | Czastkiewicz ............................. 65/504 |
| 5,509,953 | 4/1996 | Gavin ........................................ 65/504 |
| 5,514,199 | 5/1996 | Houpt ........................................ 65/504 |
| 5,595,766 | 1/1997 | Houpt et al. ............................... 65/504 |
| 5,618,328 | 4/1997 | Lin et al. ................................... 65/504 |
| 5,743,932 | 4/1998 | Houpt et al. ............................... 65/438 |

*Primary Examiner*—Stanley S. Silverman
*Assistant Examiner*—Jacqueline A. Ruller
*Attorney, Agent, or Firm*—David Bennett

[57] ABSTRACT

The present invention furnishes a device for fiberizing molten mineral materials in order to produce mineral fiber products by means of a spinner (2) having a multiplicity of orifices (6; 8) provided in the peripheral wall (4) thereof, for centrifuging molten mineral materials (10; 12) supplied to the spinner (2), with the spinner (2) comprising on the inside (14) of the peripheral wall (4) compartments (18; 20) arranged in sections and delimited by baffles (16) for separately feeding and separately receiving a respective molten material (10; 12) to at least one associated orifice (6; 8), with the orifices (6; 8) extending at least approximately in a radial direction through the peripheral wall (4). In the present invention a method for producing this device is moreover proposed.

9 Claims, 3 Drawing Sheets

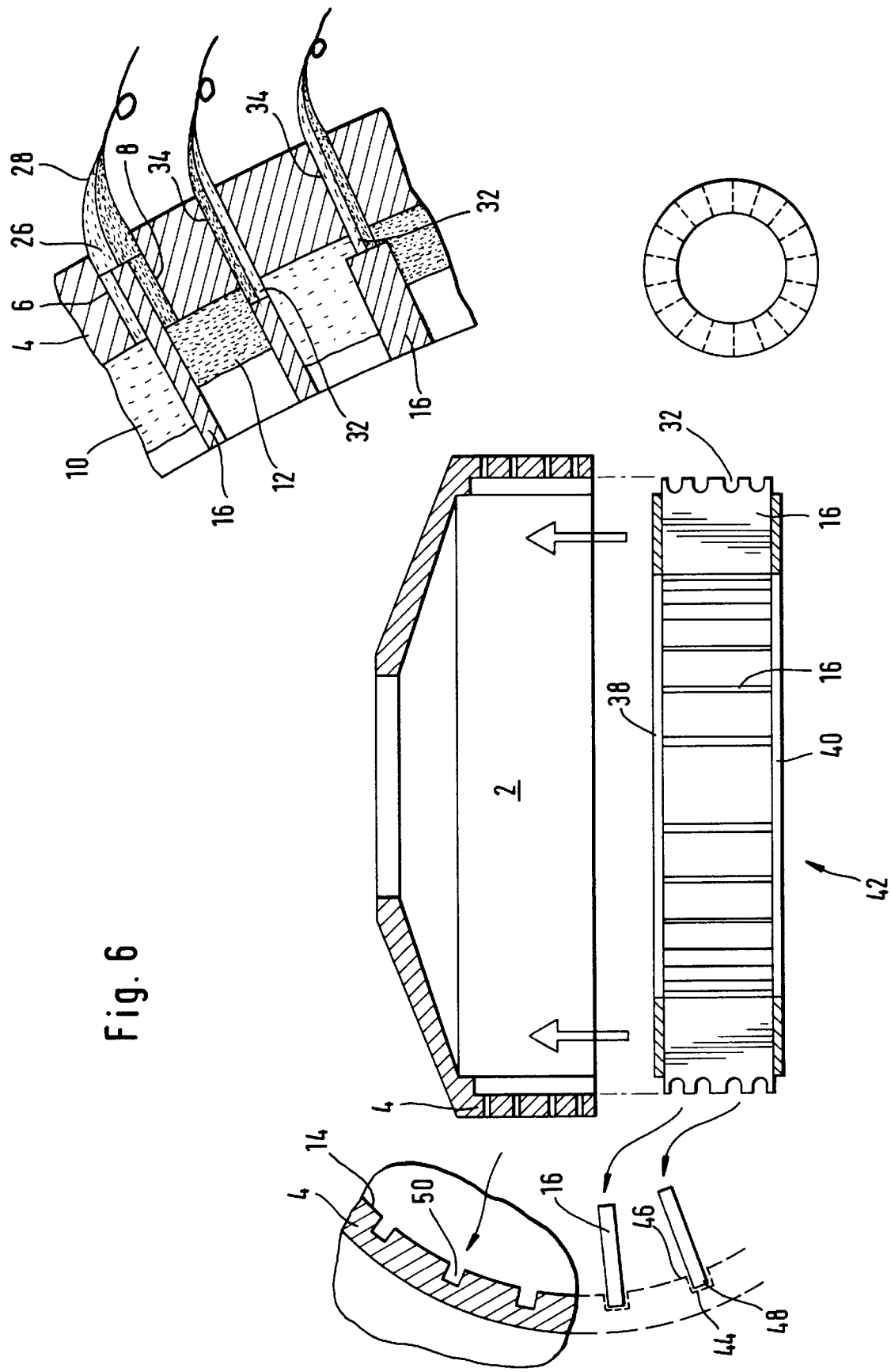

DEVICE FOR FIBERIZING MOLTEN MINERAL MATERIALS

The present invention concerns a device in accordance with the preamble of claim 1 for fiberising molten mineral materials to produce mineral wool products.

Conventional methods and devices have hitherto been used to obtain mineral wool products consisting of mineral fibers from a single molten material (cf. U.S. Pat. No. 4,203,774 or U.S. Pat. No. 4,203,748). In accordance with the so-called TEL technique, i.e. the internal rotary process with attenuating blast, this single molten mineral material is supplied to the spinner of a fiberising unit comprising in its peripheral wall a multiplicity of orifices, and centrifuged. In such fiberising units, the centrifuged molten material is, as a general rule, subjected to the supplementary attenuating effect of a gas flow usually generated by an annular burner such as disclosed e.g. in WO 93/02977.

Even though the mineral fibers produced by the described methods and the mineral wool products obtained thereby already have good thermal insulation properties, such usual methods and devices are not suited for producing fibers from two different molten materials.

A method and a device for producing bicomponent fibers are already known from U.S. Pat. No. 2,998,620. The method used is the TEL technique, however two molten mineral materials of different compositions and different coefficients of thermal expansion are fed to the spinner. Streams of either molten material flow through a common port to thus enter into surface contact with each other. The dual stream of molten material thus produced is centrifuged into a single filament and subsequently subjected to the attenuating effect of a gas flow. Thereby a bicomponent fiber is obtained from two different molten mineral materials whose different coefficients of thermal expansion result in a curling effect upon cooling, such that this bicomponent fiber has the basic but irregular shape of a helically wound thread following solidification.

Another device and method, respectively, is known from WO 95/12700. The spinner described there comprises compartments arranged in sections on the inside of the peripheral wall for separate channelling of the two molten materials, with two adjacent compartments separated by a baffle and containing different molten materials being associated with a common orifice having a slit-shaped configuration and located in the boundary area of these two compartments, wherethrough the two different molten materials can also be brought into surface contact and centrifuged. A similar device is moreover known from WO 095/29881 wherein the orifices have a "Y" or "V" configuration, respectively. By such devices bicomponent fibers can also be produced from two laterally adjacent layers of different molten materials. These bicomponent fibers also have a curly configuration following attenuation and cooling.

Producing such bicomponent fibers from two different molten materials by means of the described methods or by means of the hitherto known devices is still extremely expensive because of the high production costs for suitable fiberising units, as a result e.g. of complex orifice geometry, complicated channelling of the molten materials, and the associated expensive construction of the spinner. The throughput of molten material and thus the productivity of these fiberising units is furthermore low. As a consequence, the output of finished mineral wool products obtainable by such an installation is small, with its operation being comparatively costly.

Another drawback of the known device discussed above does, however, reside in the fact that the two different molten materials, which are provided in two adjacent compartments separated by a common baffle initially have to flow from the compartments through passages converging into a common orifice within the peripheral wall of the spinner to permit centrifugation into a common bicomponent fiber. The two passages have an angular relative orientation such as to join into the common outlet opening in a "V"-shaped configuration. Such a complex "Y" or "V"-shaped configuration of passages and orifices is, however, very difficult to produce and therefore causes high production costs. Reducing the overall cross-section of the passage by half from initially two separate passages of identical cross-sections to a common orifice furthermore brings about disadvantages in terms of flow mechanics. In order to produce the complicated "Y" geometry of two passages and a common outlet opening, finally, up to three bores must be introduced into the peripheral wall of the spinner at different angles, partly from the inside and partly from the outside. Such an expensive production method consequently brings about higher costs of the mineral wool product to be produced.

Another drawback resides in the high wear of such spinners as a result of multiple changes of flow direction, bringing about strongly abrasive corrosion of the respective passages and orifices. The result is an excessively short service life of such devices.

It is therefore the object of the invention to furnish a device for centrifuging fibers from at least two different molten mineral materials in order to produce mineral fiber products, with this device having reduced wear, i.e. improved service life, and to propose a method for producing this device wherein the production costs may be lowered and production of the orifices is substantially facilitated.

This object is attained by the present invention.

Owing to the fact that the orifices extend through the peripheral wall at least approximately in a radial direction, it is possible to use mechanical drilling techniques or machining techniques in order to produce the device of the invention. As the drill, thanks to radial orientation of the orifice, may be set in at least approximately right angles with the peripheral wall surface either from the inside or from the outside, the drill is largely precluded from running off center. This is not true for "V" and "Y" configurations of passages and orifices. If, in addition, the molten materials to be centrifuged are to be processed at particularly high temperatures, and extremely tenacious, corrosion and heat resistant materials must therefore be used in producing the spinners, other drilling techniques, such as e.g. laser drilling, electron beam drilling or electrical discharge techniques may be used, for the rectilinear extension of the orifices in the absence of bends or branches does not present high demands to the complexity of the bores to be produced, whereby a limitation to uncomplicated, cost-effective and easy-to-handle application cases of these methods is ensured.

Orifices extending at least approximately in a radial direction and preferably having a constant cross-section furthermore help to keep the flow profile of the single molten materials as simple as possible. This clearly reduces the risk of a premature failure of the device of the invention due to the described arrangement of the orifices and the good flow conditions of the molten materials obtainable thereby, for bends or deflection points which might otherwise impede free flow of the molten materials and thereby provoke intense corrosion in the range of the orifices by material erosion do not occur. As a result of the reduced wear, longer service lifes can be achieved with the device of the invention, which advantageously results in further improvement of the cost/effect calculation.

Process management may furthermore be designed to be relatively simple as regards maintaining particular temperatures over the cross-section of the peripheral wall or maintaining particular flow velocities through the orifices in order to avoid obstructions or premature solidification, i.e. strong increases of viscosity of the molten material.

Apart from this it is difficult to maintain the two molten materials at identical proportions in the bicomponent fiber in the case of complicated "Y"-shaped configurations of passages and orifices as known from the prior art, even though guided through passages having identical cross-sections, because the different molten materials may have substantially different viscosities. In order to attain a specific proportion of the two molten materials in the bicomponent fiber, expensive experimentation must at first be carried out for the known device in order to determine what composition will be realised at what cross-sections of passages for which molten material combinations.

In contrast, the device of the invention offers the advantage that due to separate radial channelling of the two orifices, the composition may already be determined in advance by means of the cross-section of the orifice through which the respective molten material emerges, without the necessity of previous experimentation. The orifice cross-sections can be varied simply as a function of the different viscosities.

In accordance with a preferred embodiment, the orifices for the first molten material adjacent to neighboring orifices for the second molten material in the area of the baffles are at a sufficient distance from each other for a radial web having the same thickness as the baffle to remain. In this manner the spinner, whose peripheral wall is generally formed integrally, can be formed in one piece with the baffles delimiting the compartments, but also separately from them. Specific requirements to the precision of orientation or precision of the bores to be introduced must moreover not be made. Placement of the orifices may be modified within wide margins. In this manner the implementation of economic, easily manageable drilling techniques is further supported.

The two separate orifices converge, in accordance with a preferred embodiment, into a common outlet in the outer range of the peripheral wall having a radial orientation. The common outlet may be introduced e.g. by means of a bore having a diameter which is larger than or identical with the external distance of the two neighboring orifices, or by means of a corresponding counterbore from the outside. This permits favorable combination in terms of flow of the two molten material streams previously guided separately while enlarging the overall flow cross-section in comparison with the single cross-sections without throttling or reduction of the flow velocity, such that the two molten materials flowing side by side are free to contact at their adjacent surfaces and combine with each other in surface contact.

In accordance with a preferred embodiment, the orifices for the first molten material, which in the areas of the baffles are adjacent neighboring orifices for the second molten material, are precisely at a sufficient distance from each other to have a common, thin web with at least approximately radial orientation. This web is formed in extension of the baffle. It has a considerably smaller thickness than the baffle itself. Such arrangement of the orifices also ensures optimum contact between the two separately channelled molten materials after they emerge from the orifices in surface contact along their mutually facing surfaces. This arrangement of orifices can furthermore be produced particularly advantageously in a spinner having a peripheral wall and integrally connecting baffles if the bores are executed to reach as far as into the baffle and there form laterally open blind bores through which the molten material reaches the associated orifice with a suitably selected flow cross-section.

If the orifices for the first molten material adjacent neighboring orifices for the second molten material in the areas of the baffles are arranged in such close proximity that a web does not remain, then, in accordance with a preferred embodiment, the two orifices advantageously merge into a single, continuous, non-circular orifice, with the result that the molten materials can already contact each other inside the orifices.

Another improvement of the flow profiles and concurrently reduced wear can be achieved by further simplification of the production in that, in accordance with a preferred embodiment, two neighboring compartments are in flow communication with a common orifice.

In accordance with a preferred embodiment, a multiplicity of the baffles, which are preferably in equidistant juxtaposition, are held by at least one common annular support and/or positioned on a common annular base. This advantageously opens up the possibility of assembling the spinner from pre-fabricated units. Such pre-fabricated units may initially be produced separately by the respectively best suited methods, whereby deliberate optimisation and thus deliberate reduction of costs is possible in single method steps.

Thus e.g. a pre-fabricated unit consisting of baffles, support and/or base can be introduced into the spinner inside the peripheral wall in a relatively simple manner in accordance with a preferred embodiment. Its coaxial orientation with respect to the spinner is also possible without major effort. Precise orientation of all the baffles relative to the orifices may then advantageously be made possible, by means of guide recesses in the peripheral wall or at least one guide projection on the inside of the peripheral wall, respectively, in engagement with the at least one counterpart provided on the pre-fabricated unit. Particularly precise and nevertheless relatively simple orientation of the baffles relative to the orifices, or of the compartments delimited by the baffles relative to the orifices, is already possible in accordance with a preferred embodiment in that at least one guide groove is provided on the inside of the peripheral wall, to be engaged by at least one baffle.

In accordance with a preferred embodiment, the baffles and the peripheral wall of the spinner can be formed integrally, whereby cost reduction is also possible in their production.

Herein it is provided to introduce bores into the peripheral wall such as to produce the orifices at least approximately perpendicular with respect to the outer surface of the peripheral wall of the spinner. By introducing the bores from the outside, working the peripheral wall is facilitated as much as possible. Nevertheless it is conceivable for the orifices to be produced by means of bores from the inside in a given case.

The orifices in the peripheral wall of the spinner can be produced by known drilling techniques such as e.g. mecanical drilling by means of machining tools, laser drilling, electron beam drilling or electrical discharge techniques. The orifices achieved thereby primarily have circular cross-sections, however other cross-sections of orifices such as e.g. orifices having an elongate cross-section or orifices having a cross-section resembling two partly overlapping circular cross-sections are imaginable.

In accordance with a preferred embodiment, vertically or horizontally extending grooves are introduced into the outer surface of the peripheral wall of the spinner. If such grooves are worked e.g. into the surface of the peripheral wall in a vertical orientation by milling or any other known technique, they may, for example, be arranged such as to extend over neighboring openings for the two different molten materials. Thus a web of remaining material having the original thickness of the peripheral wall will generally be created between these vertical grooves. Grooves may also be introduced to have a horizontal orientation by cutting or other known material-removing techniques. These horizontal grooves may e.g. be arranged such as to extend over the openings in the manner of rows. Hereby a web of remaining material also having the original thickness of the peripheral wall will generally be created between the horizontal grooves. These vertically or horizontally oriented grooves are suited to advantageously influence the local flow conditions in the vicinity of the openings e.g. by co-operating with a gas flow enveloping the peripheral wall to thus improve the conditions for spinning off the fibers to be produced.

The above described invention will be explained in more detail by making reference to the drawing wherein:

FIG. 6 shows the process of assembling a spinner according to the invention in a schematic representation.

As all of the representations in FIGS. 1 to 6 are schematically simplified diagrams, identical reference numerals shall hereinafter be used for identical or similar elements having identical or similar functions for better comprehension.

Figure 1:
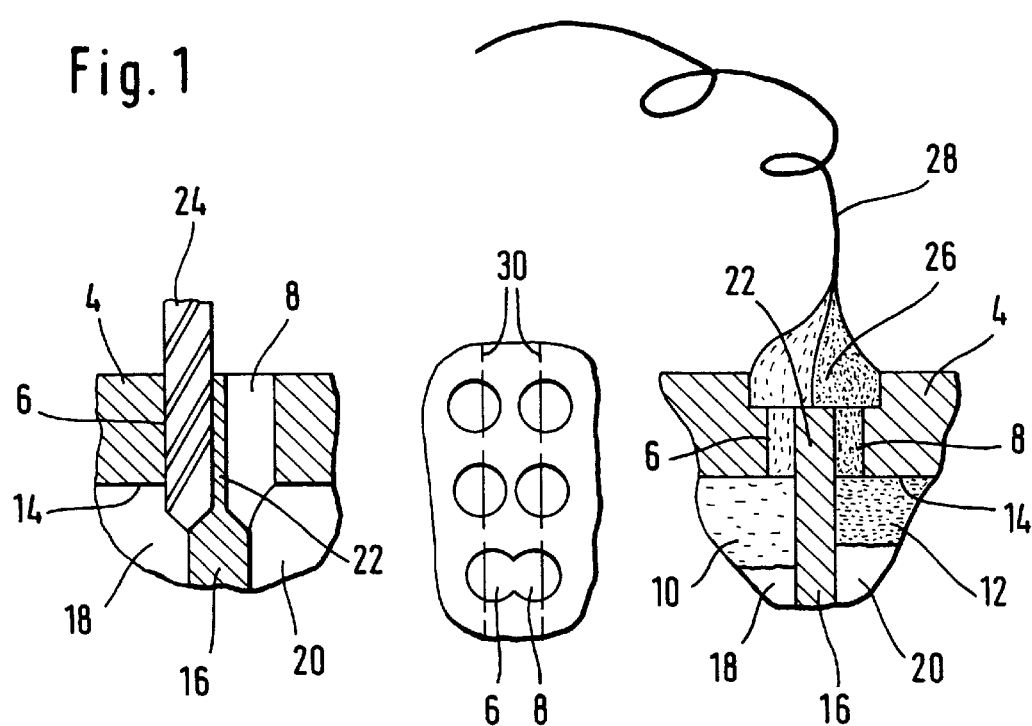
FIG. 1 shows two schematically simplified sectional views and one schematically simplified diagram of orifice configurations according to the invention in plan view.

FIG. 1 altogether shows the principles of three different orifice configurations in two schematically simplified sectional views and one schematically simplified plan view. The left-hand diagram shows a section through a peripheral wall 4 of a spinner 2 of the invention. Two orifices 6 and 8 extend in a radial direction through the peripheral wall 4. On the inside 14 of the peripheral wall the baffle is discernible, which also has a substantially radial orientation. The baffle 16 divides the represented section of the spinner 2 into a left-side compartment 18 and a right-side compartment 20 into which respective molten materials 10 and 12 (not shown) can be supplied and channelled to the respective orifices 6 and 8. The orifices 6 and 8 are located in such close proximity with each other that only a very narrow web 22 having a distinctly smaller wall thickness than the wall thickness of the baffle 16 remains. In this diagram a drilling tool 24 utilised for drilling the orifices 6 and 8 is also represented.

The right-hand diagram of FIG. 1 shows another embodiment of orifice configurations in a schematic section through the spinner 2. Inside the peripheral wall 4, there are orifices 6 and 8, in turn having a radial orientation, for centrifuging respective molten materials 10 and 12. These are located in respective compartments 18 and 20 on the inside 14 of the peripheral wall 4 which are separated by a baffle 16. In this embodiment there remains between the orifices 6 and 8 a corresponding amount of material of the peripheral wall 4 such that the remaining web 22 has precisely the same wall thickness as the baffle 16. The two orifices 6 and 8 open in the outer range of the peripheral wall 4 into an outlet 26 also having a radial orientation, which may for example be produced by a counterbore to be applied from the outside. After separately flowing through the respective orifices 6 and 8, the molten materials 10 and 12 enter into mutual surface contact inside the outlet 26 and form a bicomponent fiber 28 during centrifugation.

The middle diagram of FIG. 1 shows three different orifice configurations. In the topmost arrangement the two orifices 6 and 8 have a sufficient distance for a relatively wide web 22 remaining between them. In the middle arrangement the two orifices 6 and 8 are in precise close arrangement for only a very thin web 22 to remain. In the third arrangement, finally, a web 22 is not provided any more inasmuch as the two orifices 6 and 8 merge into the outline of a figure 8. The dashed lines 30 indicate the edges of the baffle 16 located behind them.

Figure 2:
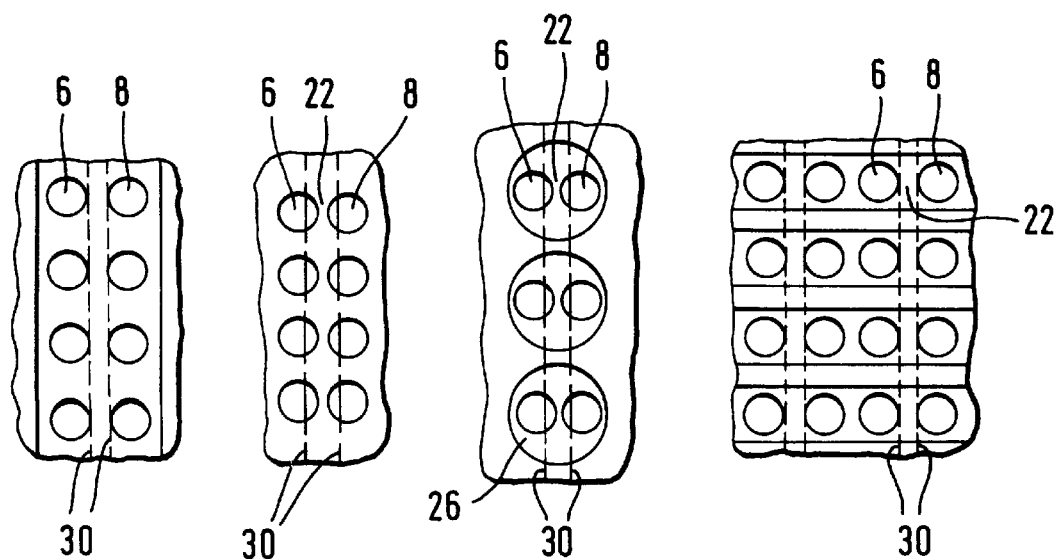
FIG. 2 shows the orifice configurations according to FIG. 1 in a schematically simplified diagram in plan view.

FIG. 2 shows in a simplified schematic representation a plan view of the peripheral wall 4 of spinner 2 with four different orifice configurations which are schematically represented side by side for the purpose of simplified representation.

The arrangement of orifices represented in the second position from the left in FIG. 2 basically conforms with the topmost arrangement of orifices of the middle diagram in FIG. 1. Orifices 6 and 8 are arranged side by side in the peripheral wall 4 in vertically consecutive horizontal rows. Radially towards the inside, represented by dashed lines 30, the baffle 16 (not shown in detail) can be seen. In this arrangement of orifices the orifices 6 and 8 are at a sufficient distance from each other for a separating layer or web 22, respectively, to remain, the thickness of which is somewhat less than the thickness of the baffle 16 located behind it.

In the arrangement of orifices shown in the third position from the left, i.e. to the right from the middle, of FIG. 2 the orifices 6 and 8 are also at a sufficient distance from each other for a separating layer or web 22 to remain, the thickness of which is slightly smaller than the thickness of the baffle 16 located behind it. This arrangement of orifices corresponds to the one shown in the righthand diagram of FIG. 1. In other words, the outlet 26 produced e.g. by countersinking or by means of a drill having a larger diameter is clearly discernible from the outside.

In the arrangement of orifices shown in the fourth position from the left, i.e. in the position on the outermost right side of FIG. 2, orifices 6 and 8 are at a sufficient distance from each other for a separating layer 22 to remain, the thickness of which approximately corresponds to the wall thickness of the baffle 16 located behind it. Orifices 6 and 8 are arranged side by side in pairs and in vertically consecutive horizontal rows. Here, too, the baffle 16 (not shown in detail) is at least indicated by the dashed lines 30. Horizontal grooves have been worked into the outer surface of the peripheral wall to extend in the manner over rows over neighboring openings 6 and 8.

In the configuration of openings depicted outermost on the left side of FIG. 2, other than in the above described configuration shown in the position on the outermost right, vertical grooves are provided in the outer surface of the peripheral wall. These vertical grooves are arranged in this exemplary embodiment to extend in the manner of columns over neighboring openings 6 and 8.

Figure 3:
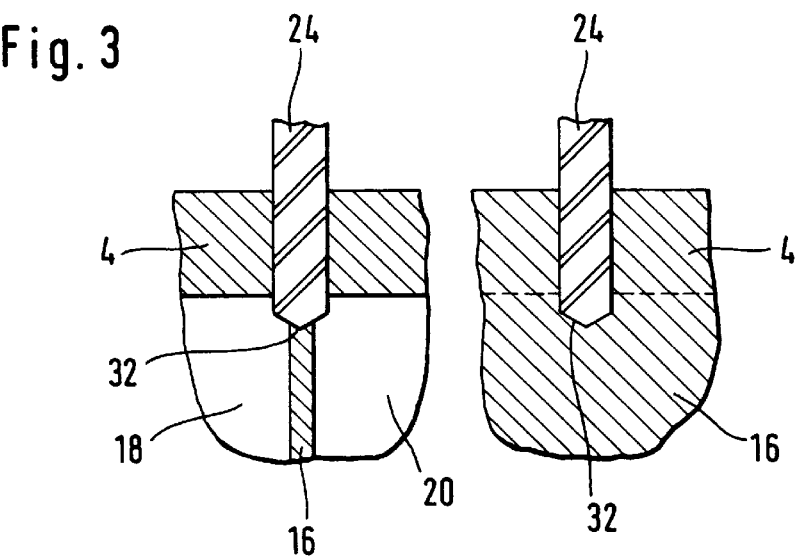
FIG. 3 shows production of an orifice according to the invention by means of a drilling tool in two schematically simplified sectional views.

In FIG. 3 another possible arrangement of orifices in the process of their production is shown by means of two schematic diagrams. In this arrangement of orifices, the orifices 6 and 8 merge into a common orifice capable of being produced by a drill 24 in one work process. Underneath the peripheral wall 4 the baffle 16 is arranged. The drill 24 has a positioning at least approximately central with respect to the baffle in a radial direction, such that by producing the common orifice the drill tip concurrently creates a recess 32 in the baffle 16. The baffle 16 defines two adjacent compartments 18 and 20, respectively, which are in flow communication by way of the recess 32 via the common orifice.

Figure 4:
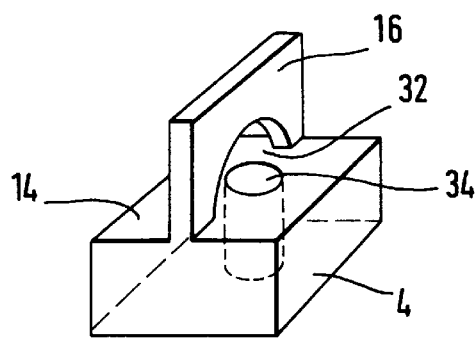
FIG. 4 shows the output range of an arrangement according to the invention in a three-dimensional schematic diagram.

A three-dimensional diagram in accordance with FIG. 4 shows the arrangement of baffle 16 at the peripheral wall 4 in the output range of the above mentioned common orifice 34 and of the recess 32 located in the baffle 16 and having a semicircular configuration in the present example. The baffle 16 is arranged in a radial direction on the inside 14 of the peripheral wall 4, centrally with respect to the common orifice 34.

Figure 5:
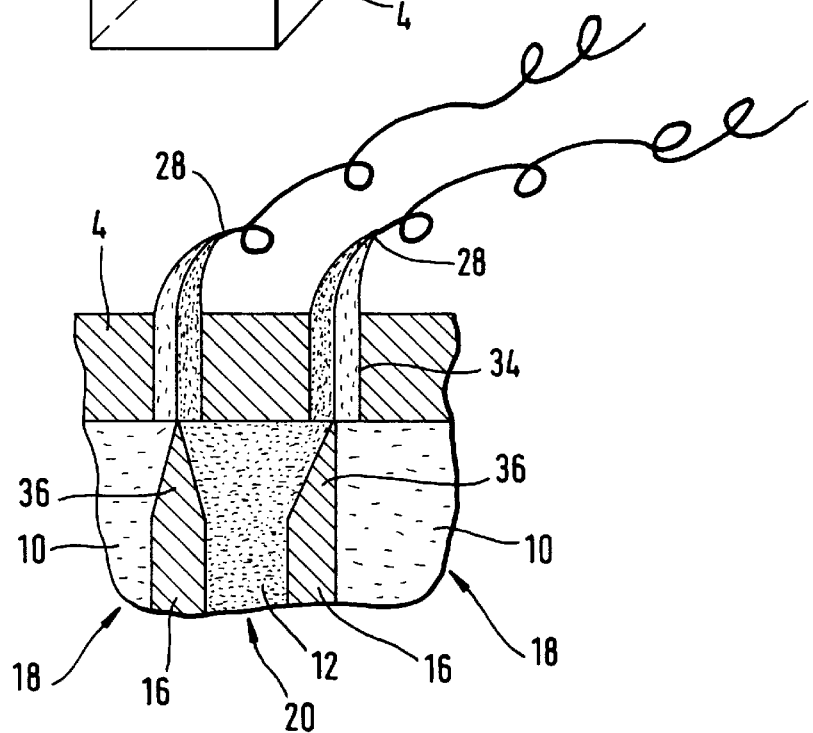
FIG. 5 shows the output range of another arrangement according to the invention in a schematically simplified sectional view.

An arrangement of orifices similar to the one in the diagram of FIG. 4 is shown in FIG. 5 by means of a schematically simplified cross-sectional view. In this view, two radially oriented common orifices 34 in the peripheral wall 4 are depicted in juxtaposition. Out of the common orifices 34 one respective bicomponent fiber 28 made up of the two molten materials 10 and 12 is centrifuged. The molten materials 10 and 12 are contained in respective compartments 18 and 20 which are separated from each other by baffles 16. The baffles 16 comprise in an exemplary case a "V"-shaped point or taper 36 and in the other variation only a triangular taper 36 on one side. The baffles 16 are oriented at least approximately centrally in a radial direction with respect to the radially extending longitudinal axis of the common orifice 34.

In FIG. 6, assembly of an embodiment of the device of the invention is shown by means of a schematically simplified, schematic representation. A multiplicity of the baffles 16 preferably arranged in equidistant juxtaposition is held by at least one common annular support 38 and/or arranged on a common annular base 40. The unit 42 thus constituted by baffles 16, support 38 and/or base 40 is pre-fabricated and can be introduced into the spinner 2 inside the peripheral wall 4 in the pre-fabricated state. This pre-fabricated unit 42 has a coaxial alignment with the spinner inside the latter. Insertion of the unit 42 into the spinner 2 is indicated by the two large arrows in the direction of movement towards the spinner 2. Several of the baffles 16 represented in FIG. 6 comprise a series of recesses 32.

In the right-side part of FIG. 6 a portion of the peripheral wall 4 is represented in schematically simplified cross-section. In this portion common orifices 34 as well as orifices 6 and 8 opening into a common outlet 26 are shown. In the latter configuration of orifices the baffle 16 is extended as far as in between the orifices 6 and 8 in the form of the separating layer or web 22. In the other configuration of orifices the baffle 16 comprises a recess 32 to enable flow communication of adjacent compartments into the common orifice 34. The baffles 16 separate the compartments 18 and 20 from each other and may present different wall thicknesses.

In the left-side area of FIG. 6, the peripheral wall 4 is also shown in a schematic cross-section of a portion thereof. Here, too, the baffles 16 can be discerned. At least one guide recess 44 is provided in the peripheral wall or at least one guide projection 46 is provided on the inside 14 of the peripheral wall, respectively. At least one counterpart 48 arranged in the pre-fabricated unit 42 is in engaging cooperation with the the guide recess 44 or the guide projection 46, respectively, in order to enable precisely aligned orientation of all the baffles 16 with the orifices 6 and 8. In a particularly preferred embodiment at least one guide groove 50 is provided on the inside 14 of the peripheral wall 4, wherein at least one baffle 16 can engage in order to ensure accurate orientation.

For producing mineral fibers having high corrosion resistance and good flexibility a soft glass may, for example, be used as the first molten material. Besides good fiber flexibility this offers further advantages such as e.g. low spinner wear. A hard glass, e.g. rock melt or basalts may be used as the second molten material. These hard glasses impart good resistance against external chemical and thermal influences to the fiber.

One of the molten materials may e.g. furthermore be stained whereby the obtained bicomponent fiber may be be given any desired coloring. The one molten material can moreover be optimised with respect to the mechanical or thermal properties in order to increase resistance and improve insulating properties whereas the second fiber can, for example, be selected under the aspect of physiological compatibility or other health-related aspects.

The conditions for fiberising the two molten materials can furthermore be optimised largely separately by the device of the invention whereby optimisation of the device against wear is possible. As particularly in contrast with the device known from the prior art a complex geometry of passages and orifices in "V" or "Y"-shaped configurations is avoided, adaptation of the orifices to the different viscosities of the molten materials is readily possible. Wear can moreover be reduced substantially as branches or bends do not occur in the flow management, which might be eroded by the molten material due to corrosion. A constant cross-section of the device through the entire service life is moreover ensured hereby.

We claim:

1. Device for fiberizing molten mineral materials to produce mineral fiber products comprising a spinner (2) having provided in its peripheral wall (4) a multiplicity of orifices (6; 8) for centrifuging molten mineral materials (10; 12) supplied to said spinner (2), with said spinner (2) comprising on the inside (14) of said peripheral wall (4) compartments (18; 20) arranged in sections and delimited by baffles (16) for separately feeding and separately receiving a respective molten material to at least one associated orifice (6; 8), said orifices (6; 8) are circular in cross-section and extend through said peripheral wall (4) in an at least approximately radial direction, characterized in that said orifices (6) for said first molten material (10) and adjacent neighboring orifices (8) are positioned at a sufficient distance from each other for a radial web (22) having a thickness no greater than that of the baffle to remain.

2. Device in accordance with claim 1, characterised in that said orifices (6) for said first molten material (10) adjacent neighboring orifices (8) for said second molten material (12) in the areas of the baffles (16) are positioned at a sufficient distance from each other for a radial web (22) having the thickness of said baffle (16) to remain.

3. Device in accordance with claim 1, characterised in that said orifices (6) for said first molten material (10) adjacent neighboring orifices (8) for said second molten material (12) in the areas of said baffles (16) are positioned at a precisely sufficient distance from each other to comprise a common, thin radially oriented web (22) formed in extension of said baffle (16), with said web (22) having a substantially smaller thickness than said baffle (16).

4. Device for fiberizing molten mineral materials to produce mineral fiber products, comprising a spinner (2) having provided in its peripheral wall (4) a multiplicity of orifices for centrifuging molten mineral materials (10; 12) supplied to said spinner (2), with said spinner comprising on the inside (14) of said peripheral wall (4) compartments (18; 20) arranged in sections and delimited by baffles (16) for separately feeding and separately receiving a respective molten material (10; 12) to at least one said associated orifice which is circular in cross-section and extends through said peripheral wall in an at least approximately radial direction characterized in that two neighboring compartments (18; 20) are in flow communication with a common orifice (34) having a circular cross-section and that said baffle (16) in the output range of said common orifice comprises a preferably semi-circular recess (32) to improve flow of both molten materials (10; 12) towards said common orifice.

5. Device for fiberizing molten mineral materials to produce mineral fiber products, comprising a spinner (2) having provided in its peripheral wall (4) a multiplicity of orifices for centrifuging molten mineral materials (10; 12) supplied to said spinner (2), with said spinner comprising on the inside (14) of said peripheral wall (4) compartments (18; 20) arranged in sections and delimited by baffles (16) for separately feeding and separately receiving a respective molten material (10; 12) to at least one said associated orifice which is circular in cross-section and extends through said peripheral wall in an at least approximately radial direction characterized in that two neighboring compartments (18; 20) are in flow communication with a common orifice (34) having a circular cross-section and that said baffle in the output range of said common orifice (34) has a tapering configuration to improve the flow of both molten materials towards said common orifice.

6. Device in accordance with claim 1, characterised in that a unit (42) consisting of baffles (16), support (38) and/or base (40) is pre-fabricated and introduced into said spinner (2) inside said peripheral wall (4) such as to have a coaxial arrangement with said spinner (2).

7. Device for fiberizing molten materials to produce mineral fiber products, comprising a spinner (2) having provided in its peripheral wall (4) a multiplicity of orifices for centrifuging molten mineral materials (10; 12) supplied to said spinner (2), with said spinner comprising on the inside (14) of said peripheral wall (4) compartments (18; 20) arranged in sections and delimited by baffles (16) for separately feeding and separately receiving a respective molten material (10; 12) to at least one said associated orifice which is circular in cross-section and extends through said peripheral wall in an at least approximately radial direction characterized in that a unit (42) consisting of baffles (16), support (38) and/or base (40) is pre-fabricated and introduced into said spinner (2) inside said peripheral wall (4) such as to have a coaxial arrangement with said spinner (2) and that at least one guide recess (44) is provided in said peripheral wall (4), or at least one guide projection (46) is provided on the inside (14) of said peripheral wall (4), respectively, to engage with at least one counterpart (46) provided on said pre-fabricated unit (42) and enable precise orientation of all the baffles (16) with said orifices.

8. Device for fiberizing molten materials to produce mineral fiber products, comprising a spinner (2) having provided in its peripheral wall (4) a multiplicity of orifices for centrifuging molten mineral materials (10; 12) supplied to said spinner (2), with said spinner comprising on the inside (14) of said peripheral wall (4) compartments (18; 20) arranged in sections and delimited by baffles (16) for separately feeding and separately receiving a respective molten material (10; 12) to at least one said associated orifice which is circular in cross-section and extends through said peripheral wall in an at least approximately radial direction characterized in that a unit (42) consisting of baffles (16), support (38) and/or base (40) is pre-fabricated and introduced into said spinner (2) inside said peripheral wall (4) such as to have a coaxial arrangement with said spinner (2) and that at least one guide groove (50) is provided on the inside of said peripheral wall (4) in engagement with at least one baffle (16) in order to enable precise orientation.

9. Device in accordance with claim 1, characterised in that said baffles (16) and said peripheral wall (4) of said spinner (2) are formed integrally.

* * * * *